US007851407B2

(12) United States Patent
Kim et al.

(10) Patent No.: US 7,851,407 B2
(45) Date of Patent: Dec. 14, 2010

(54) PRODUCTION METHOD OF TITANIUM DIOXIDE ($TIO_2$) PHOTOCATALYST AND $TIO_2$ PHOTOCATALYST PRODUCED BY THE SAME (75) Inventors: Tae Jeong Kim, Gyeongsangbukdo (KR); Wha Jung Kim, Daegu (KR); Sun Woo Kim, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 432 days.

(21) Appl. No.: 12/122,956

(22) Filed: May 19, 2008

(65) Prior Publication Data

US 2009/0286676 A1 Nov. 19, 2009

(30) Foreign Application Priority Data

May 15, 2008 (KR) ...................... 10-2008-0044986

(51) Int. Cl.
B01J 23/00 (2006.01)
C01G 25/02 (2006.01)
C01G 27/02 (2006.01)
C01G 23/047 (2006.01)
C09K 3/00 (2006.01)

(52) U.S. Cl. ...................... 502/350; 502/349; 423/608; 423/610; 516/90

(58) Field of Classification Search ................ 502/349, 502/350; 423/608, 610; 516/90
See application file for complete search history.

(56) References Cited

U.S. PATENT DOCUMENTS 4,042,758 A 8/1977 Weinstein et al.
5,897,958 A * 4/1999 Yamada et al. .............. 446/474
6,037,289 A * 3/2000 Chopin et al. ................ 502/2
6,362,121 B1 * 3/2002 Chopin et al. ................ 502/2
6,770,257 B1 * 8/2004 Imura et al. ................ 423/610
6,956,006 B1 * 10/2005 Mirsky et al. .............. 502/236
7,431,903 B2 * 10/2008 Koyanagi et al. ............. 423/81

FOREIGN PATENT DOCUMENTS

KR 10-2002-0043133 * 6/2002
KR 2002-0088013 * 11/2002
KR 10-2002-0092067 * 12/2002

OTHER PUBLICATIONS

Honda, K. and Fujishima, A., "TiO2 Photoelectrochemistry and Photocatalysis", Nature, 1972, vol. 237, pp. 37-38.
"Doping titanium dioxide with a non-metallic material", Science, 2008.
Khan, Romana, "A Novel Acid-Base Catalyzed Sol-Gel Synthesis . . . ", Bull. Korean Chem. Soc., 2007, pp. 1951, vol. 28, No. 11, Kyungpook National University, Korea.

* cited by examiner

Primary Examiner—Patricia L Hailey
(74) Attorney, Agent, or Firm—IpHorgan Ltd.

(57) ABSTRACT

A method for producing a titanium dioxide photocatalyst is provided. The method uses a sol-gel process wherein acid and base catalysts are added in two separate steps. According to the method, a titanium dioxide photocatalyst with increased mesoporosity can be produced without the use of any particular additive. Further, an anatase structure is formed upon drying and is maintained even after high-temperature calcination. Further provided is a titanium dioxide photocatalyst produced by the method. Further provided is a titanium dioxide photocatalyst doped with sulfur and zirconium, which is produced by using the method. The doped titanium dioxide photocatalyst exhibits catalytic activity even under visible light and excellent surface characteristics to achieve improved photocatalytic activity.

16 Claims, 11 Drawing Sheets $hv_1$ — Pure $TiO_2$
$hv_2$ — Metal doping
$hv_3$ — Dye-sentization
$hv_4$ — Non-metal doping

Fig.1

$hv_1$ — Pure TiO$_2$
$hv_2$ — Metal doping
$hv_3$ — Dye-sentization
$hv_4$ — Non-metal doping

PRODUCTION METHOD OF TITANIUM DIOXIDE (TIO$_2$) PHOTOCATALYST AND TIO$_2$ PHOTOCATALYST PRODUCED BY THE SAME

CROSS REFERENCE TO RELATED APPLICATION

This application is a Paris Convention application which claims priority of Korean application number 10-2008-0044986 filed May 15, 2008, the entire specification of which is incorporated by reference.

BACKGROUND OF THE INVENTION

1. Field of the Invention

The present invention relates to a method for producing a titanium dioxide (TiO$_2$) photocatalyst and a titanium dioxide photocatalyst produced by the method. More specifically, the present invention relates to a method for producing a titanium dioxide photocatalyst using a sol-gel process wherein an acid and a base are added in two separate steps to achieve high mesoporosity and improved surface characteristics while maintaining an anatase crystal structure even at high temperatures, and a titanium dioxide photocatalyst produced by the method. The present invention also relates to a titanium dioxide photocatalyst doped with sulfur and zirconium that possesses catalytic activity even in the visible region, and exhibits excellent surface characteristics in terms of surface area, pore size, pore volume, etc. and improved catalytic activity.

2. Description of the Related Art

Since Honda and Fujishima of Tokyo University reported the photocatalytic degradation of water using a titanium dioxide photocatalyst in the journal *Nature* in 1972, much research on novel photocatalysts using semiconductor materials (e.g., titanium dioxide) has been consistently conducted for scientific and commercial purposes. Particularly, titanium dioxide photocatalysts based on nanotechnology, which is currently in the spotlight, have been used throughout the world as means to remove pollutants causing serious environmental problems. Titanium dioxide photocatalysts have been found to offer the possibility of energy storage in recent years. It is thus anticipated that titanium dioxide photocatalysts will be continuously researched as promising energy storage materials. A disadvantage associated with the use of titanium dioxide as a photocatalyst is that light of short wavelengths in the ultraviolet (UV) region is required. For these reasons, there is a continuing need to modify pure titanium dioxide to develop photocatalytic materials capable of possessing photocatalytic activity even under visible light. Doping with metallic or non-metallic materials, surface modification, composite formation with other semiconductor materials and so forth have heretofore been known as modification methods of titanium dioxide.

Titanium dioxide photocatalysts doped with metallic materials have been extensively investigated for a long time. Most of the titanium dioxide photocatalysts doped are expected to react under visible light because a reduction in band gap due to the metallic materials is observed. However, the reactivity of the titanium dioxide photocatalysts is known to be poor due to the possibility that the time when electrons and holes separately exist may be relatively short depending on the kind and amount of metals used in comparison with pure titanium dioxide. In attempts to overcome the problems of the doping with metallic materials, titanium dioxide photocatalysts doped with non-metallic materials have been developed. According to a recent report in the journal *Science*, doping titanium dioxide with a non-metallic material, such as nitrogen or carbon, induces a decrease in band gap, resulting in high reactivity under visible light. Since then, numerous studies around the world have focused on titanium dioxide photocatalysts doped with non-metallic materials.

In recent years, efforts have been made to develop titanium dioxide photocatalysts with better catalytic activity that are doped with both metallic and non-metallic materials rather than with a non-metallic material only. Such efforts are still in very early stages and research is actively underway to find suitable combinations between metallic and non-metallic materials.

SUMMARY OF THE INVENTION

The present invention has been made in an effort to solve the above problems, and it is one object of the present invention to provide a method for producing a titanium dioxide photocatalyst with high mesoporosity and improved surface characteristics by which an anatase structure is formed upon drying and is maintained stable even at high temperatures.

It is another object of the present invention to provide a titanium dioxide photocatalyst produced by the method.

It is still another object of the present invention to provide a titanium dioxide photocatalyst doped with sulfur and zirconium that exhibits catalytic activity even under visible light, excellent surface characteristics and improved catalytic activity.

In accordance with one aspect of the present invention, there is provided a method for producing a titanium dioxide photocatalyst, the method comprising the steps of: (1) adding a solution ("Solution A") containing an acid, water and an organic solvent dropwise to a solution of a titanium alkoxide in an organic solvent with stirring until the pH of the resulting solution is adjusted to 0.5 to 2.0; (2) reacting the mixed solution with stirring for 12 to 48 hours to form a sol; (3) adding a basic aqueous solution dropwise at a rate of 0.05 to 0.5 ml/sec to the reaction solution with stirring until the pH of the resulting solution reaches 6.0 to 10.0 to convert the sol to a gel; (4) drying the gel at 110° C. for 12 hours, followed by pulverization to obtain a powder; and (5) calcining the powder at 350 to 800° C.

The method of the present invention may further comprise the step of aging the gel for 2 to 5 hours and washing the aged gel after step (3).

In step (1), Solution A is added in an amount such that the molar ratio of the titanium alkoxide to the water is between 1:10 and 1:30.

Step (1) further includes the sub-step of simultaneously adding an organic solution ("Solution B") containing a metal source and a non-metal source and Solution A dropwise to dope the final titanium dioxide photocatalyst with the metal and the non-metal.

In accordance with another aspect of the present invention, there is provided a titanium dioxide photocatalyst produced by the method.

In accordance with yet another aspect of the present invention, there is provided a titanium dioxide photocatalyst doped with sulfur and zirconium.

In an embodiment of the present invention, the zirconium may be doped in an amount of 0.5 to 6 parts by weight, based on 100 parts by weight of titanium dioxide.

In an embodiment of the present invention, the sulfur may be doped in an amount of 0.1 to 1.5 parts by weight, based on 100 parts by weight of titanium dioxide.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in detail.

Sol-gel processing is the most widely used process for producing titanium dioxide photocatalysts because the physical and chemical properties of particles can be controlled during the production of the photocatalysts. The method of the present invention uses a novel sol-gel process wherein acid and base catalysts are added in two separate steps, instead of the conventional sol-gel process, to achieve improved mesoporosity, crystallinity and high-temperature stability.

According to the method of the present invention, a titanium dioxide photocatalyst is produced by the following procedure:

(1) A solution ("Solution A") containing an acid, water and an organic solvent is added dropwise to a solution of a titanium alkoxide in an organic solvent with stirring until the pH of the resulting solution is adjusted to 0.5 to 2.0;

(2) the mixed solution is allowed to react with stirring for 12 to 48 hours to form a sol;

(3) a basic aqueous solution is added dropwise at a rate of 0.05 to 0.5 ml/sec to the reaction solution with stirring until the pH of the resulting solution reaches 6.0 to 10.0 to convert the sol to a gel;

(4) the gel is dried at 110° C. for 12 hours, followed by pulverization to obtain a powder; and (5) the powder is calcined at 350 to 800° C.

Figure 2:
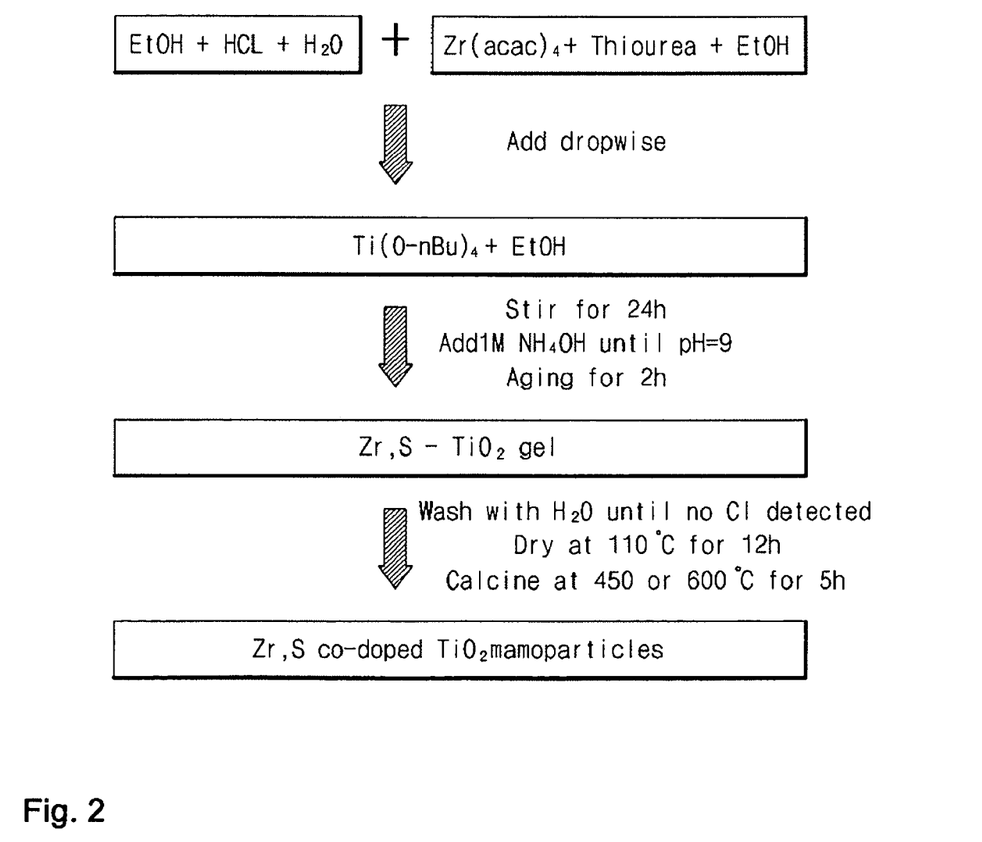
FIG. 2 schematically depicts a method for producing a titanium dioxide photocatalyst doped with sulfur and zirconium.

The procedure is simplified in FIG. 2.

More detailed explanation of the method according to the present invention will be described below.

In step (1), after the addition of Solution A, it is important to adjust the amount of the acid until the initial pH of the resulting solution reaches 0.5 to 2, preferably 0.8. Since hydrolysis and polycondensation simultaneously occur in a typical sol-gel process using a metal alkoxide as a raw material, the reaction rates and the physical properties of particles can be controlled by varying reaction factors, such as the amount of an acid or base catalyst, the kind of a solvent and the reaction temperature. In the method of the present invention, the acid catalyst is added in an excessively large amount to markedly decrease the initial pH, which retards the polymerization rate to stabilize the sol state, unlike in the conventional sol-gel process. When the pH is below the lower limit, a number of micropores are formed. Meanwhile, when the initial pH is above the upper limit, the reaction rate is not effectively decreased, and as a result, an increment in the number of mesopores and an improvement in crystallinity are not expected.

In step (1), it is preferred that Solution A be added to adjust the molar ratio of the titanium alkoxide to the water to 1:10 to 1:30. When Solution A is added in an amount such that the water content is less than the lower limit, the reaction is not completed to form amorphous titanium dioxide rather than crystalline titanium dioxide. Meanwhile, when Solution A is added in an amount such that the water content is more than the upper limit, the titanium concentration is relatively low, resulting in low productivity.

The titanium alkoxide may be selected from the group consisting of tetraethyl orthotitanate, titanium tetraisopropoxide, tetrabutyl orthotitanate, and mixtures thereof Tetrabutyl orthotitanate is preferred.

The organic solvent may be a $C_1$-$C_6$ aliphatic alcohol. Examples of such aliphatic alcohols include methanol, ethanol, propanol and butanol. Ethanol is preferred.

Any acid known in the art may be used without any particular limitation, and specific examples thereof include nitric acid, hydrochloric acid, phosphoric acid, acetic acid, formic acid, carbonic acid and sulfuric acid. Nitric acid, hydrochloric acid or sulfuric acid is preferably used for the production of anatase titanium dioxide. Hydrochloric acid is more preferred.

In step (2), the mixed solution is allowed to react with stirring for 12 to 48 hours to form a sol. After twelve hours following the reaction, the reaction solution becomes more opaque and begins to form a sol. The sol state is stabilized as the reaction time increases. Although the reaction is allowed to proceed for more than 24 hours, the sol state is not changed any more. That is, the maximum catalytic activity is obtained when the reaction proceeds for 24 hours. Accordingly, the reaction time is preferably defined to be 24 hours.

In step (3), a basic aqueous solution is added dropwise to the reaction solution with stirring until the pH of the resulting solution reaches 6.0 to 10.0. Step (3) is carried out to add a base to the sol formed in step (2) to form a gel. The basic aqueous solution is added dropwise at a rate of 0.05 to 0.5 ml/sec to gradually increase the pH of the mixed solution, preferably until pH 9. As the pH is increased by the addition of the base, the polymerization of the sol proceeds and the gel-forming rate increases. Accordingly, the basic aqueous solution is added dropwise at the rate defined above, i.e. the pH is gradually increased, so that the sol is slowly converted to a gel. The degree of crystallization tends to increase as the reaction slowly proceeds. High degree of crystallization retards the recombination time of electrons and holes, which is expected to increase the activity of the catalyst. Numerous crystal structures are not formed and instead an anatase structure is stabilized at a high pH when compared to at a low pH. The anatase structure is predominantly formed at a final pH of at least 6, and the band gap energy tends to increase at a pH higher than 10.

Any base known in the art may be used without any particular limitation, and specific examples thereof include sodium hydroxide, potassium hydroxide, ammonium hydroxide, ammonia and amine. Ammonium hydroxide is preferred.

The method of the present invention may further comprise the step of aging the gel for 2 to 5 hours and washing the aged gel after step (3). The gel is aged for about 2 hours to release liquid ingredients contained therein, resulting in a volume shrinkage. The aging makes the gel harder and more rigid. During the aging, the structural rearrangement of the gel takes place due to dissolution and reprecipitation, resulting in an increase in the degree of crystallization. Thereafter, the aged gel is washed to remove the remnants.

In step (4), the washed gel is dried at 110° C. for 12 hours, followed by pulverization to obtain a powder. According to the conventional sol-gel process, the gel remains amorphous even after drying. In contrast, according to the method of the present invention, an anatase crystal structure of the gel appears after drying.

A portion of the titanium prepared at room temperature does not exist in an anatase form but is amorphous. In step (5), calcination for phase control is performed at a high temperature of 350 to 800° C. to crystallize the amorphous titanium. As a result of the calcination, anatase $TiO_2$ is prepared. Heating of titanium prepared by the conventional sol-gel process for phase control causes a loss of catalytic activity due to increased size and decreased specific surface area of the particles. Further, a maximum of 400° C. is the temperature limit for the maintenance of the anatase crystal structure. In contrast, the anatase crystal structure of the titanium dioxide photocatalyst produced by the method is maintained without formation of any other crystal structure despite high-temperature calcination at 800° C. Since this high-temperature calcination improves the crystallinity of the photocatalyst, the recombination rate of electrons and holes is retarded to achieve improved catalytic activity.

Step (1) further includes the sub-step of simultaneously adding an organic solution ("Solution B") containing a metal source and a non-metal source and Solution A dropwise to dope the final titanium dioxide photocatalyst with the metal and the non-metal.

In an embodiment of the present invention, Solution B contains a zirconium source and a sulfur source and is added together with Solution A to dope the titanium dioxide photocatalyst with zirconium and sulfur.

The zirconium source may be selected from the group consisting of zirconium acetylacetonate, zirconium chloride, zirconyl chloride hydrate, and mixtures thereof. Zirconium acetylacetonate is preferred.

The sulfur source may be selected from the group consisting of thiourea, thioacetamide, sulfuric acid and mixtures thereof. Thiourea is preferred.

According to the conventional sol-gel process, an acid or base catalyst is used to produce a titanium dioxide photocatalyst. The use of the acid catalyst is advantageous because of small particle size and increased surface area of the titanium dioxide photocatalyst. However, anatase and brookite phases coexist. Particularly, the use of too large an amount of the acid catalyst renders the size of the titanium dioxide photocatalyst small to form nanopores. Meanwhile, the use of the base catalyst is advantageous in the formation of mesopores, but high-temperature calcination decreases the mesoporosity of the titanium dioxide photocatalyst.

In contrast, the method of the present invention uses a novel sol-gel process wherein an acid and a base are added in two separate steps to retard the polymerization rate while gradually varying the pH to produce a catalyst with increased mesoporosity. An additive, such as an organic or inorganic binder, is commonly used to increase the mesoporosity of a catalyst. In contrast, according to the sol-gel process used in the present invention, a photocatalyst with increased mesoporosity can be produced without the use of any particular additive. Mesopores are defined as pores having a pore size between 2 to 50 nm, micropores are defined as pores having a size smaller than 2 nm, and macropores are defined as pores having a size larger than 50 nm. Micropores are too small in size to contain large materials and their entrances are likely to be clogged. Macropores have a relatively small surface area and are too large in size to efficiently perform catalytic chemical reactions. Therefore, mesopores are most suitable for catalytic reactions.

Crystal structures of titanium dioxide are largely classified into anatase, rutile and brookite crystal structures. Of these, titanium dioxide having an anatase crystal structure is particularly advantageous in terms of activity. According to the sol-gel process of the present invention wherein acid and base catalysts are added in two separate steps, an anatase type titanium dioxide is produced. An anatase structure is not formed until calcination in a titanium dioxide photocatalyst produced by the conventional sol-gel process, whereas an anatase structure only is formed upon drying before calcination and is maintained even after high-temperature calcination in the titanium dioxide photocatalyst produced by the method of the present invention. Further, the mesoporosity of the titanium dioxide photocatalyst is maintained during and after high-temperature calcination, thus achieving high degree of crystallization, and as a result, the recombination rate of electrons and holes can be retarded, thus leading to an increase in the catalytic activity of the titanium dioxide photocatalyst.

The present invention also provides a titanium dioxide photocatalyst that is doped with sulfur and zirconium by the sol-gel process in which an acid and a base are added in two separate steps to exhibit catalytic activity even under visible light. Like the undoped catalyst produced by the method of the present invention, the doped catalyst has a high mesoporosity. Further, an anatase crystal structure is formed upon drying and is maintained even at high temperatures in the doped catalyst.

The sulfur/zirconium-doped titanium dioxide photocatalyst can be produced by any known suitable method, for example, sol-gel processing, other than the method of the present invention.

Figure 1:
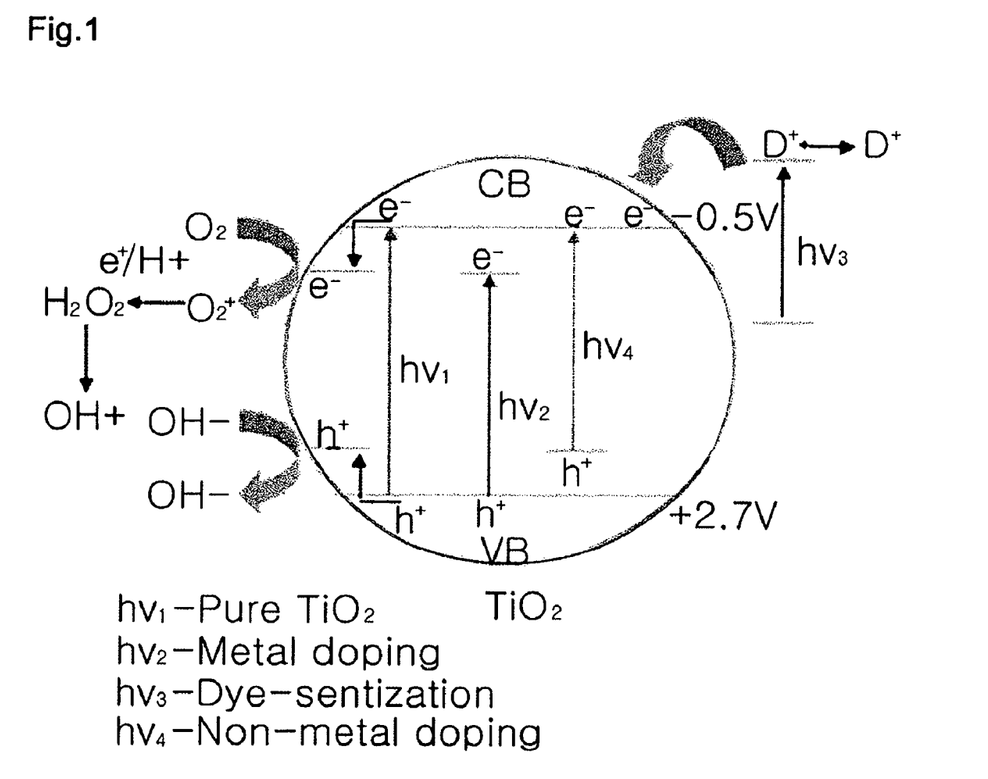
FIG. 1 is a diagram illustrating the reaction principle of a visible light photocatalyst.

Titanium dioxide is irradiated with a particular level of energy (e.g., UV light) to generate electrons ($e^-$) and holes ($h^+$). Hydroxyl radicals (OH.) are generated by the holes. The hydroxyl radicals participate in the degradation of organic substances. Titanium dioxide as a photocatalyst requires light of short wavelengths in the ultraviolet region. Since visible light is the largest portion of sunlight, there is a need for catalysts that exhibit activity even under visible light. FIG. 1 is a diagram illustrating the reaction principle of a visible light photocatalyst. According to the reaction principle illustrated in FIG. 1, doping with a metallic or non-metallic material reduces the energy (i.e. band gap energy) required for the separation of electrons from holes to allow a reaction to occur under light (e.g., visible light) weaker than UV.

In the present invention, doping with sulfur and zirconium reduces the band gap energy to allow the photocatalyst to exhibit photocatalytic activity even in the visible region and improved catalytic activity. By doping with sulfur and zirconium, $Ti^{4+}$ or $O^{2-}$ present within the $TiO_2$ structure is replaced with $Zr^{4+}$ and $S^{2-}$ to increase the lattice energy of the photocatalyst Zr,S—$TiO_2$, which will distort the lattice. Due to this distortion of the lattice, structural defects, such as oxygen vacancies, will probably appear on the surface of the Zr,S—$TiO_2$. Once the vacancies are formed in the lattice, oxygen ions ($O^{2-}$) are separated from the catalyst surface and sequentially combine with holes, which are generated upon light irradiation. As a result, the oxygen ions are converted to $O^-$ and finally oxygen atoms (O). The oxygen atoms (O) react with and degrade organic substances on the catalyst surface. Therefore, it can be concluded that the doped photocatalyst has better catalytic activity than the undoped catalyst.

When energy is received to increase the probability that electrons combine with holes, the catalytic activity is reduced. An improvement in catalytic activity would also be a factor for the production of better visible light photocatalysts. Zirconium is an element that effectively retards the recombination rate of electrons and holes. Accordingly, the use of zirconium aids in increasing the catalytic activity.

The surface characteristics, such as surface area, particle size and pore size, of the catalyst according to the present invention are improved by doping with sulfur and zirconium. Particularly, the zirconium doping blocks the crystal growth induced during calcination to maintain the porosity of the catalyst, thus effectively increasing the surface area of the catalyst. The average crystallite size decreases with increasing amount of zirconium used.

In an embodiment of the present invention, the zirconium may be doped in an amount of 0.5 to 6 parts by weight, based on 100 parts by weight of the titanium dioxide. When the zirconium is doped in an amount of less than 0.5 parts by weight, i.e. the zirconium content of the doped photocatalyst is low, an improvement in the surface characteristics of the doped photocatalyst is negligible. Meanwhile, when the zirconium is doped in an amount of more than 6 parts by weight, a reduction in catalytic activity is caused.

In an embodiment of the present invention, the sulfur may be doped in an amount of 0.1 to 1.5 parts by weight, based on 100 parts by weight of the titanium dioxide. When the sulfur is doped in an amount of less than 0.1 parts by weight, little or no catalyst activity is exhibited in the visible region. Meanwhile, when the sulfur is doped in an amount of more than 1.5 parts by weight, i.e. the amount of the zirconium doped is small, an improvement in surface characteristics is insignificant, resulting in a reduction in catalytic activity.

Hereinafter, the present invention will be explained in more detail with reference to the following examples including comparative examples. However, these examples are given merely for the purpose of illustration and are not intended to limit the scope of the present invention.

EXAMPLES

Example 1

A titanium dioxide photocatalyst was produced using a sol-gel process in which an acid and a base were added in two separate steps in accordance with the following procedure:

(1) Tetrabutyl orthotitanate (Ti(O-nBu)$_4$, 21.3 mL, 62.5 mmol) was dissolved in ethanol (140 ml) to prepare a solution of the Ti(O-nBu)$_4$.

(2) Distilled water (22.0 mL, 1.2 mol) and an aqueous hydrochloric acid solution (6.0 mL, 0.20 mol) were added to ethanol (70 mL) to prepare a solution ("Solution A"). Solution A was added dropwise to the Ti(O-nBu)$_4$ solution with stirring until pH 0.8. After completion of the addition, stirring was continued at room temperature for 24 hours.

(3) 1 M NH$_4$OH solution was added dropwise to the mixed solution with stirring until pH 9.0. The resulting solution was gradually converted to a gel. After the gel was observed, aging was performed for 2 hours, followed by filtration to remove the remaining solution. The filtered gel was washed with distilled water to remove the remnants.

(4) The gel was dried at 110° C. for 12 hours and pulverized to obtain a powder.

(5) The powder was heated to 450° C. or 600° C. at a rate of 1° C./min and calcined for 5 hours to produce a $TiO_2$ photocatalyst.

Example 2

Zirconium acetylacetonate (Zr(acac)$_4$, 0.15 g, 0.30 mmol) and thiourea (2.38 g, 31.25 mmol) were added to ethanol (70 mL) to prepare a solution ("Solution B"). The procedure of Example 1 was repeated except that Solution B and Solution A were added dropwise in step (2) of Example 1 to produce $^{0.5}$Zr,S—$TiO_2$. In the photocatalyst, zirconium was doped in an amount of 0.5 parts by weight, based on 100 parts by weight of titanium dioxide.

Example 3

$^1$Zr,S—$TiO_2$ was produced in the same manner as in Example 2 except that the amount of the zirconium source was changed. In the photocatalyst, zirconium was doped in an amount of one part by weight based on 100 parts by weight of titanium dioxide.

Example 4

$^3$Zr,S—$TiO_2$ was produced in the same manner as in Example 2 except that the amount of the zirconium source was changed. In the photocatalyst, zirconium was doped in an amount of 3 parts by weight based on 100 parts by weight of titanium dioxide.

Example 5

$^5$Zr,S—$TiO_2$ was produced in the same manner as in Example 2 except that the amount of the zirconium source was changed. In the photocatalyst, zirconium was doped in an amount of 5 parts by weight based on 100 parts by weight of titanium dioxide.

Example 6

A titanium dioxide photocatalyst doped with sulfur only was produced in the same manner as in Example 2 except that zirconium acetylacetonate was not added.

Example 7

A titanium dioxide photocatalyst doped with zirconium only was produced in the same manner as in Example 2 except that thiourea was not added.

Comparative Example 1

A titanium dioxide photocatalyst was produced by the conventional sol-gel process in accordance with the following procedure.

(1) Tetrabutyl orthotitanate (Ti(O-nBu)$_4$, 30 mL) was dissolved in ethanol (10 ml) to prepare a solution of the Ti(O-nBu)$_4$. The Ti(O-nBu)$_4$ solution was introduced into 180 ml of distilled water with stirring in a flask.

(2) Immediately after the introduction of the Ti(O-nBu)$_4$ solution was finished, 2 ml of an aqueous hydrochloric acid solution was added and stirred at room temperature for 12 hours.

(3) Drying was performed at 110° C. for 12 hours to obtain a gel, followed by pulverization to obtain a powder.

(5) The powder was heated at a rate of 1° C./min and calcined at 400° C. for 5 hours to produce a TiO$_2$ photocatalyst.

Experimental Example 1

Figure 3:
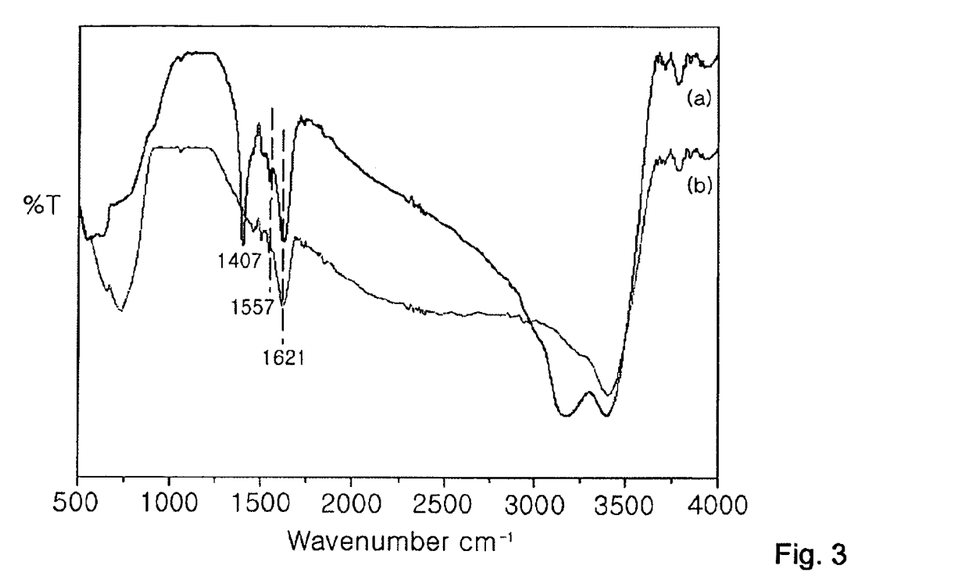
FIG. 3 shows FT-IR spectra of $^3$Zr,S—TiO$_2$: after drying at 110° C. (a) and after calcination at 450° C. (b)

The catalysts were characterized by FT-IR analysis using a Mattson FT-IR Galaxy 7020A spectrophotometer. The spectral results are shown in FIG. 3. FIG. 3 shows FT-IR spectra of the $^3$Zr,S—TiO$_2$ produced in Example 4: after drying at 110° C. (a) and after calcination at 450° C. (b). From the two spectra, the common broad band observed at below 1,000 cm$^{-1}$ is assigned to the crystal lattice vibration of TiO$_2$, and the bands observed at 1,621-1,623 cm$^{-1}$ and 3,500-3,000 cm$^{-1}$ are assigned to the stretching vibration of hydroxyl groups. Particularly, the band observed at 1,407 cm$^{-1}$ in FIG. 3(a) corresponds to the deformation induced by the remaining ammonium ions, which were generated from the degradation of the thiourea, on the catalyst surface. The band was not observed in FIG. 3(b) because of the high calcination temperature. The C—N—H deformation mode accounts for the weak band observed at 1,557 cm$^{-1}$ in FIG. 3(a) and FIG. 3(b). This band observation indicates that the degradation of the thiourea was presumably incomplete, and instead, a portion of the thiourea was present in the titanium dioxide lattice.

Experimental Example 2

Figure 4:
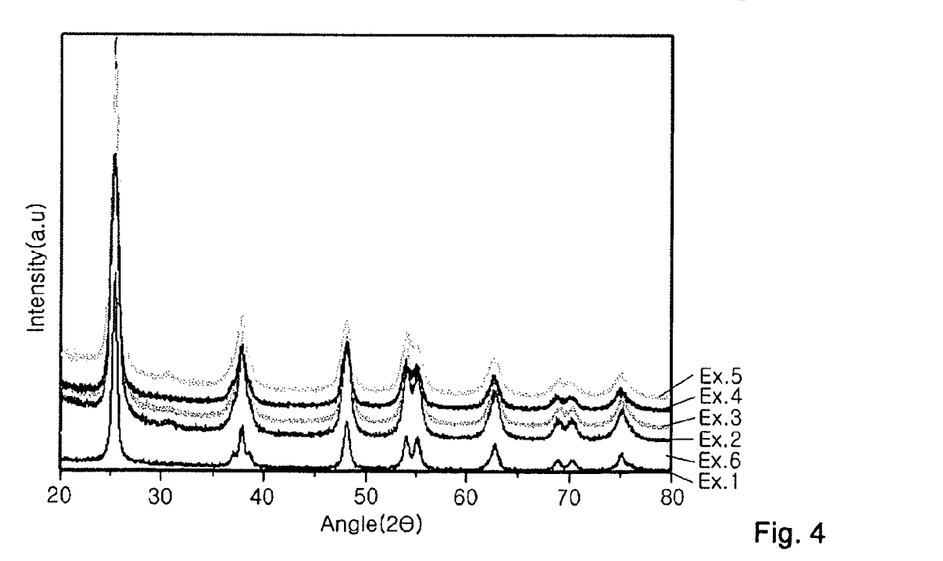
FIG. 4 shows XRD patterns of catalysts after calcination at 450° C.: TiO$_2$ (a), S—TiO$_2$ (b), $^{0.5}$Zr,S—TiO$_2$ (c), $^1$Zr,S—TiO$_2$ (d), $^3$Zr,S—TiO$_2$ (e) and $^5$Zr,S—TiO$_2$ (f)

X-ray diffraction (XRD) was performed to determine the crystal structures of the titanium dioxide photocatalysts. The XRD patterns were obtained using a multi-purpose X-ray diffractometer (X'pert PRO MRD/X'pert PRO MPD, Cu Kα, λ=1.54059 Å) at a scan rate of 0.03° (2θ)/s. FIG. 4 shows the XRD patterns of the catalysts produced in Examples 1-6 after calcination at 450° C. Each of the S—TiO$_2$ and the $^x$Zr,S—TiO$_2$ series had a relatively broad diffraction peak for crystal plane (101) than the TiO$_2$. It appears that this is because a dopant, such as S or Zr, was introduced into the TiO$_2$ to distort the lattice structure of the TiO$_2$. To see the variation in the lattice structure of the TiO$_2$ by doping in more detail, crystal planes (101) and (200) were used to determine the lattice constants of the catalysts by the following equations:

Bragg's equation: $d_{(hkl)} = \lambda/2 \sin\theta$ $d^{-2}_{(hkl)} = h^2 a^{-2} + k^2 b^{-2} + l^2 c^{-2}$ wherein $d_{(hkl)}$ is the spacing between crystal planes (hkl), λ is the wavelength of X-rays, θ is the diffraction angle of crystal planes (hkl), hkl is the crystal index, and a, b and c are the lattice constants (a=b≠c because the anatase structure is tetragonal).

The results are summarized in Table 1. The data in Table 1 clearly show that there are no significant differences in the a- and b-axis lattice constants of all TiO$_2$ samples but the c-axis lattice constants of the samples doped with Zr and S increased. The ionic radii of $Zr^{4+}$ and $S^{2-}$ as the dopants are 0.72 Å and 1.7 Å, respectively, which are larger than $Ti^{4+}$ (0.61 Å) and $O^{2-}$ (1.22 Å) present within the TiO$_2$ structures. When $Ti^{4+}$ or $O^{2-}$ present within the TiO$_2$ structures was replaced with $Zr^{4+}$ and $S^{2-}$, the dopants having larger ionic radii were arranged along the c-axis. It is believed that this c-axis arrangement will be responsible for the higher c-axis lattice constants of the doped TiO$_2$ than the c-axis lattice constant of the undoped TiO$_2$. Therefore, the Zr,S—TiO$_2$ catalysts will have a higher lattice energy, which causes a distortion of the lattices. Due to this distortion of the lattices, structural defects, such as oxygen vacancies, will probably appear on the surface of the Zr,S—TiO$_2$ catalysts.

The average crystallite sizes of the catalysts can be calculated using crystal plane (101) by Scherrer's equation. The results are shown in Table 1. The data in Table 1 show that the average crystallite sizes of the doped TiO$_2$ catalysts [11.33 nm for the S—TiO$_2$ and 10.78~7.99 nm for the $^x$Zr,S—TiO$_2$] are smaller than the average crystallite size of the pure TiO$_2$ (14.05 nm). The average crystallize sizes of the $^x$Zr,S—TiO$_2$ series become smaller with increasing Zr amount, which indicates that $Ti^{4+}$ was replaced with Zr or S in the course of the sol-gel synthesis to block the crystal growth. This phenomenon is consistent with the calculated results of the lattice constants.

TABLE 1

| Catalysts | Lattice parameters (Å) | | Crystallite size (nm) |
|---|---|---|---|
| | a = b | c | |
| TiO$_2$ (Example 1) | 3.7872 | 9.3561 | 14.05 |
| $^{0.5}$Zr,S—TiO$_2$ (Example 2) | 3.7818 | 9.5478 | 10.78 |
| $^1$Zr,S—TiO$_2$ (Example 3) | 3.7834 | 9.5530 | 9.02 |
| $^3$Zr,S—TiO$_2$ (Example 4) | 3.7759 | 9.6507 | 8.83 |
| $^5$Zr,S—TiO$_2$ (Example 5) | 3.7820 | 9.4994 | 7.99 |
| S—TiO$_2$ (Example 6) | 3.7787 | 9.4063 | 11.33 |

Experimental Example 3

Figure 5:
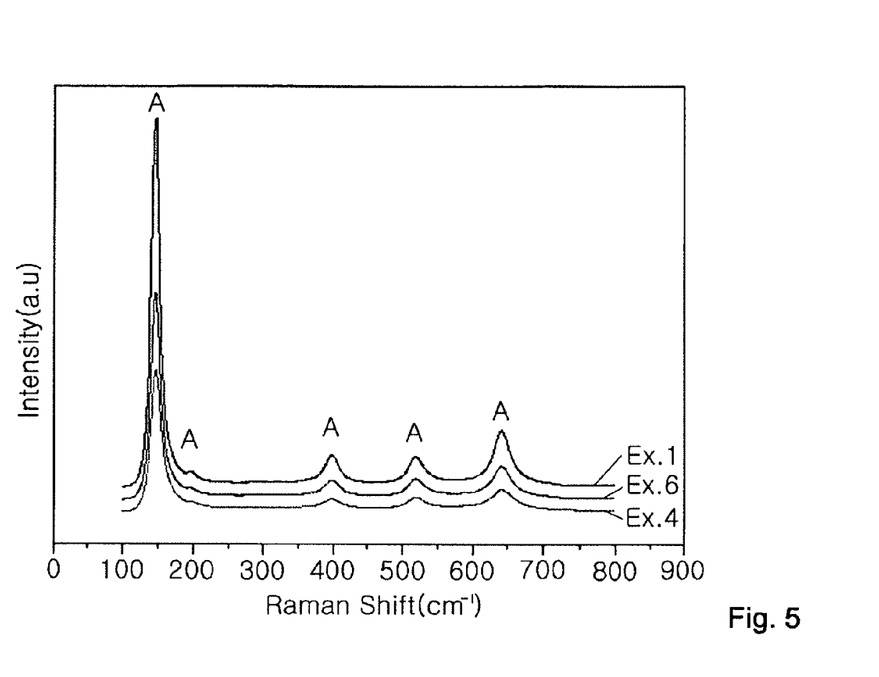
FIG. 5 shows Raman spectra of TiO$_2$, S—TiO$_2$ and $^3$Zr,S—TiO$_2$ after calcination at 450° C.: TiO$_2$ (a), S—TiO$_2$ (b) and $^3$Zr,S—TiO$_2$ (c)

Raman spectroscopy was used to identify the anatase crystal structure of the catalysts. A laser Raman spectrophotometer (model: Ramalog 9I) was employed for the Raman measurements. The results are shown in FIG. 5. FIG. 5 shows the Raman spectra of the catalysts after calcination at 450° C. Typical Raman-active bands of anatase TiO$_2$ are known to be 144, 197, 399, 515, 519, and 639 cm$^{-1}$, which represent $E_g$, $E_g$, $B_{1g}$, $A_{1g}$, $B_{1g}$, and $E_g$ symmetry modes, respectively. All spectra are in good agreement with the Raman-active bands of anatase TiO$_2$, indicating that the titanium dioxide photocatalysts produced in Examples 1, 4 and 6 have an anatase crystal structure. In actuality, five Raman-active bands were obtained, probably because $A_{1g}$ and $B_{1g}$ bands overlap into one band. The Raman bands of the doped TiO$_2$ catalysts are found to be slightly shifted from those of the pure TiO$_2$ catalyst. This shift is believed to be because the crystallite sizes were decreased by doping. This fact is consistent with the previously obtained XRD results.

Experimental Example 4

Figure 6:
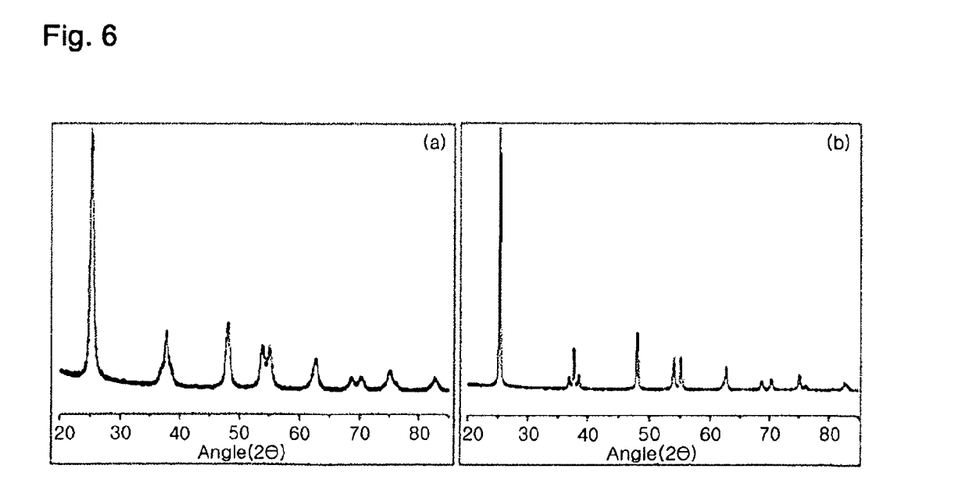
FIG. 6 shows XRD patterns of $^3$Zr,S—TiO$_2$ after calcination at different temperatures: 600° C. (a) and at 800° C. (b)

To check the stability of anatase crystallinity at high temperatures, the photocatalyst produced in Example 4 was calcined at high temperatures of 600° C. (FIG. 6(a)) and 800° C. (FIG. 6(b)). The XRD patterns of the calcined photocatalyst are shown in FIG. 6. As can be seen from FIG. 6, no rutile structure was observed, and instead, the sample calcined at 800° C. was found to have an anatase crystal structure only. For comparison, the $TiO_2$ produced in Comparative Example 1 was calcined at 600° C. A rutile structure (50%) was partially found in the sample of Comparative Example 1.

Consequently, even when the titanium dioxide photocatalyst produced by the sol-gel process of the present invention was calcined at high temperatures, the anatase crystal structure was stably maintained. This structural stability will lead to a high degree of crystallization, which retards the recombination time of electrons and holes to achieve increased catalytic activity.

Experimental Example 5

Figure 7:
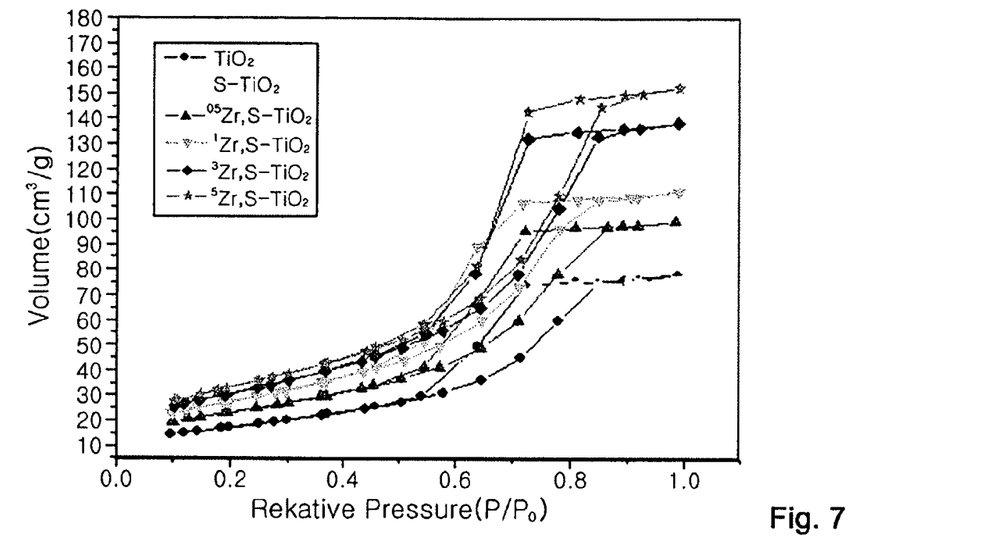
FIG. 7 shows nitrogen adsorption/desorption isotherms of catalysts.
Figure 8:
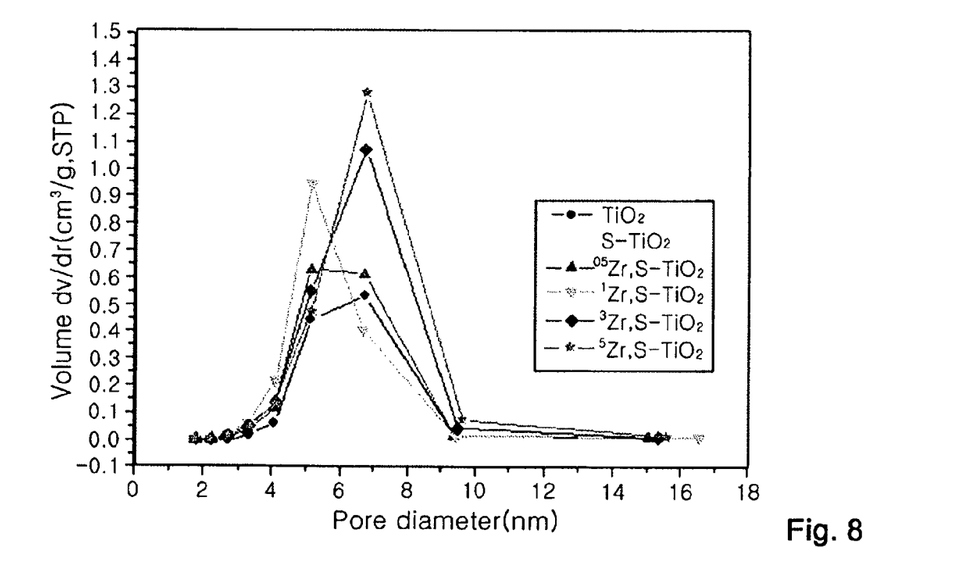
FIG. 8 is a graph showing the pore size distribution of catalysts.

The surface characteristics, including surface area, pore size and pore volume, of the catalysts were analyzed. For the analysis, nitrogen adsorption/desorption tests on the catalysts calcined at 450° C. at liquid nitrogen temperature (77 K) were conducted using a Quantachrome Instrument (NOVA 2000 series) to obtain respective nitrogen adsorption/desorption isotherms. The results are shown in FIG. 7. The Barrett-Joyner-Halenda (BJH) method was used to determine the pore size distributions of the catalysts derived from the BJH desorption isotherms. The results are shown in FIG. 8. The surface areas of the catalysts were determined using the Brunauer-Emmett-Teller (BET) method. The results are shown in Table 2.

TABLE 2

| Catalysts | BET surface area (m²/g) | BJH pore volume (cm³/g)$^a$ | Pore diameter (nm)$^b$ |
|---|---|---|---|
| $TiO_2$ (Example 1) | 63.37 | 0.120 | 3.796 |
| $^{0.5}$Zr,S—$TiO_2$ (Example 2) | 84.30 | 0.161 | 5.164 |
| $^1$Zr,S—$TiO_2$ (Example 3) | 100.4 | 0.181 | 5.171 |
| $^3$Zr,S—$TiO_2$ (Example 4) | 112.2 | 0.224 | 6.771 |
| $^5$Zr,S—$TiO_2$ (Example 5) | 120.4 | 0.245 | 6.798 |
| S—$TiO_2$ (Example 6) | 80.08 | 0.125 | 4.113 |
| $TiO_2$ (Comparative Example 1) | 47.50 | 0.09 | 2.847 |

$^a$Measured from the amount of nitrogen adsorbed at $P/P_o = 0.99$
$^b$Estimated from the desorbed portions of the isotherms by the EBJH method It is evident from Table 2 that the pore diameters of the catalysts were increased with increasing Zr amount and in the presence of sulfur. That is, the introduction of Zr and S is responsible for the increased mesoporosity of the $TiO_2$ catalysts. In addition, the surface areas and the pore sizes of the photocatalysts produced by the sol-gel process of the present invention are larger than those of the $TiO_2$ produced in Comparative Example 1, indicating improved surface characteristics of the photocatalysts.

As shown in FIG. 7, the profile of the isotherm of the $TiO_2$ produced in Example 1 is the typical Type 4 isotherm, which is known to be characteristic of mesoporous materials. The graph of FIG. 8 show that the average pore sizes of the catalysts are between 3.8 and 6.8 nm, which fall within the size range of mesopores. Therefore, the catalysts produced by the method of the present invention have proved to be mosoporous in size. In conclusion, the $TiO_2$ catalysts and the $TiO_2$ catalysts doped with sulfur and zirconium, which were produced using a sol-gel process wherein an acid or base is added in two separate steps, showed excellent surface characteristics in terms of surface area, pore volume and pore radius when compared to the $TiO_2$ produced by the conventional sol-gel process.

Experimental Example 6

Figure 9:
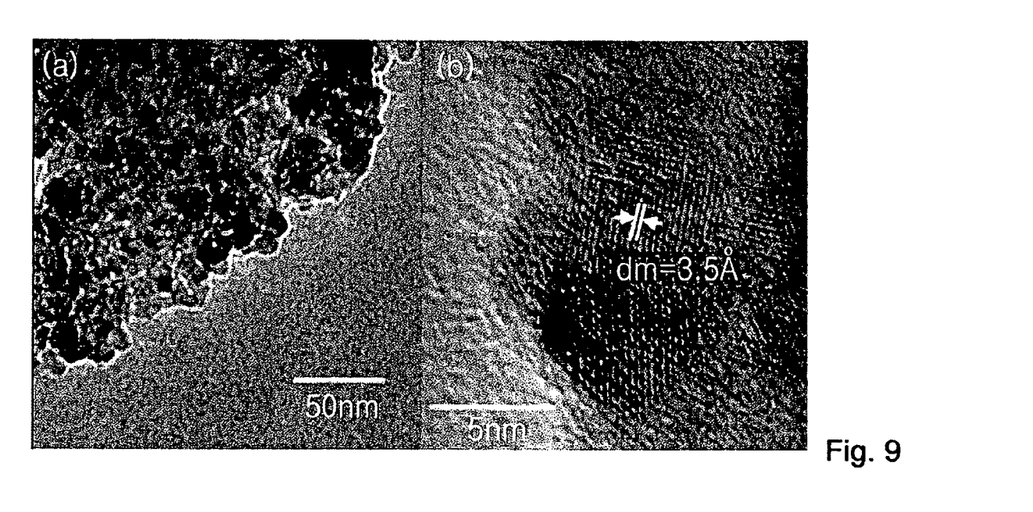
FIG. 9 shows TEM images of $^3$Zr,S—TiO$_2$.

The $^3$Zr,S—$TiO_2$ produced in Example 4 was observed under a high-resolution transmission electron microscope (HR-TEM) (model: JEOL, JEM 3010), operating at 300 kV, to analyze the morphology of the catalyst. FIG. 9 shows TEM images of the catalyst produced in Example 4. FIG. 9(a) shows that small particles were aggregated to form mesopores. The particles were determined to have an average size of 6-7 nm, which is in good agreement with the value obtained from the XRD patterns. FIG. 9(b) is an HR-TEM image of the catalyst. From the image, the spacing between the lattices is determined to be 3.5 Å, indicating typical anatase $TiO_2$ crystallinity.

Experimental Example 7

UV-visible diffuse reflectance spectrophotometry (DRS) was employed to observe whether the catalysts were active or not even in the visible region. For the DRS analysis, a UV-Vis spectrophotometer (Model Shimadzu UV-2450 diffuse reflectance mode) using $BaSO_4$ as a reference material were used.

Figure 10:
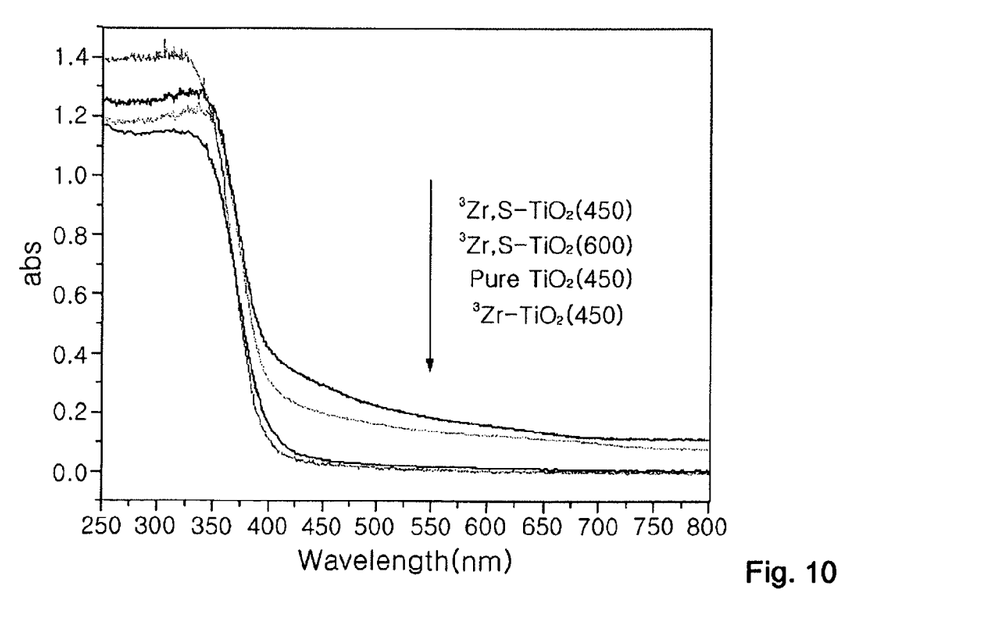
FIG. 10 shows diffuse reflectance spectra (DRS) of TiO$_2$, $^3$Zr—TiO$_2$ and $^3$Zr,S—TiO$_2$ at 450° C.

FIG. 10 shows diffuse reflectance spectra of the $TiO_2$, $^3$Zr—$TiO_2$ and $^3$Zr,S—$TiO_2$ catalysts of Examples 1, 7 and 4, respectively, which were produced using the sol-gel process of the present invention at 450° C. It is clear from the graph of FIG. 10 that the absorption wavelengths of the sulfur-containing samples only were shifted to the visible spectral region. Hence, the S—$TiO_2$ and Zr,S—$TiO_2$ catalysts are expected to exhibit catalytic activity under visible light.

The band gap energies of the $TiO_2$, $^3$Zr—$TiO_2$, $^3$Zr,S—$TiO_2$ catalysts are 3.18, 3.17 and 3.02 eV, respectively, as determined by the following equation.

$E_g = 1239.8/\lambda$ ($\lambda$ is the maximum absorption wavelength of the catalyst)

The results in FIG. 10 suggest that calcination temperature is also a factor affecting the band gap energy of the catalysts. The DRS results show that the $^3$Zr,S—$TiO_2$ catalyst after calcination at 450° C. and 600° C. had a band gap energy at 600° C. of 3.09 eV, which was higher than that at 450° C. However, the band gap energy of the $^3$Zr,S—$TiO_2$ catalyst was lower than the band gap energies of the $TiO_2$ and $^3$Zr—$TiO_2$ catalysts. From these results, the $^3$Zr,S—$TiO_2$ catalyst is expected to be reactive under visible light to some extent.

Experimental Example 8

X-ray photoelectron spectroscopy (XPS) was performed to measure the contents of S and Zr in the $^3$Zr,S—$TiO_2$ catalyst (Example 4) after calcination at 450° C. XPS is a quantitative spectroscopic technique that analyzes chemical substances present on the surface of nanocrystals. For the XPS analysis, a VG Scientific ESCALAB 250 XPS spectrophotometer was used.

Figure 11:
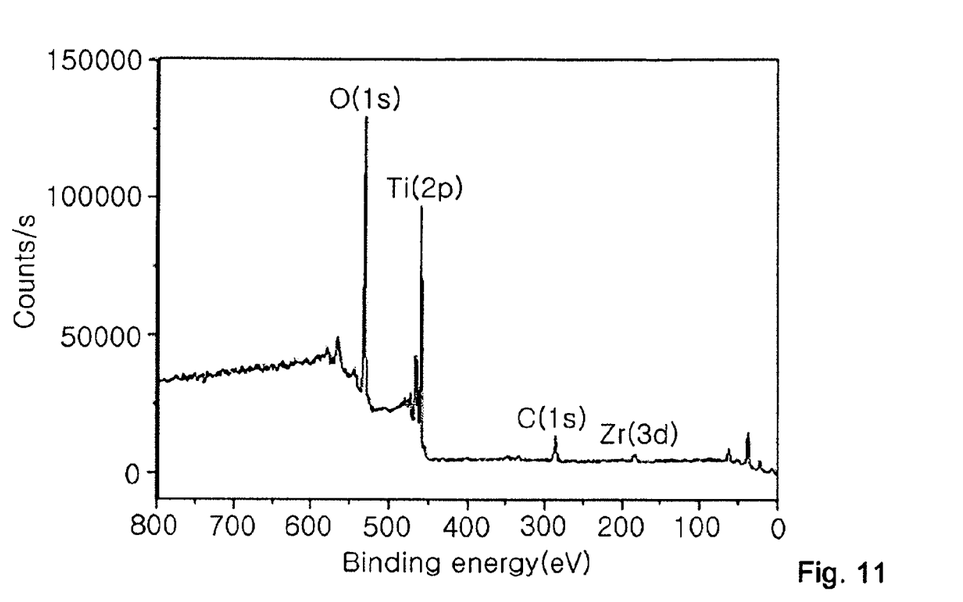
FIG. 11 is an XPS survey spectrum of $^3$Zr,S—TiO$_2$ after calcination at 450° C.

FIG. 11 is an XPS survey spectrum of the $^3$Zr,S—TiO$_2$ catalyst after calcination at 450° C. The spectrum of FIG. 11 shows that Ti, O, C and Zr were present but S was absent in the $^3$Zr,S—TiO$_2$ catalyst after calcination at 450° C. The reason why no sulfur was detected is probably believed to be because sulfur was not readily dispersed in the TiO$_2$ lattice in the course of the synthesis. It appears that the sulfur amount fell outside the XPS analysis range.

Figure 12:
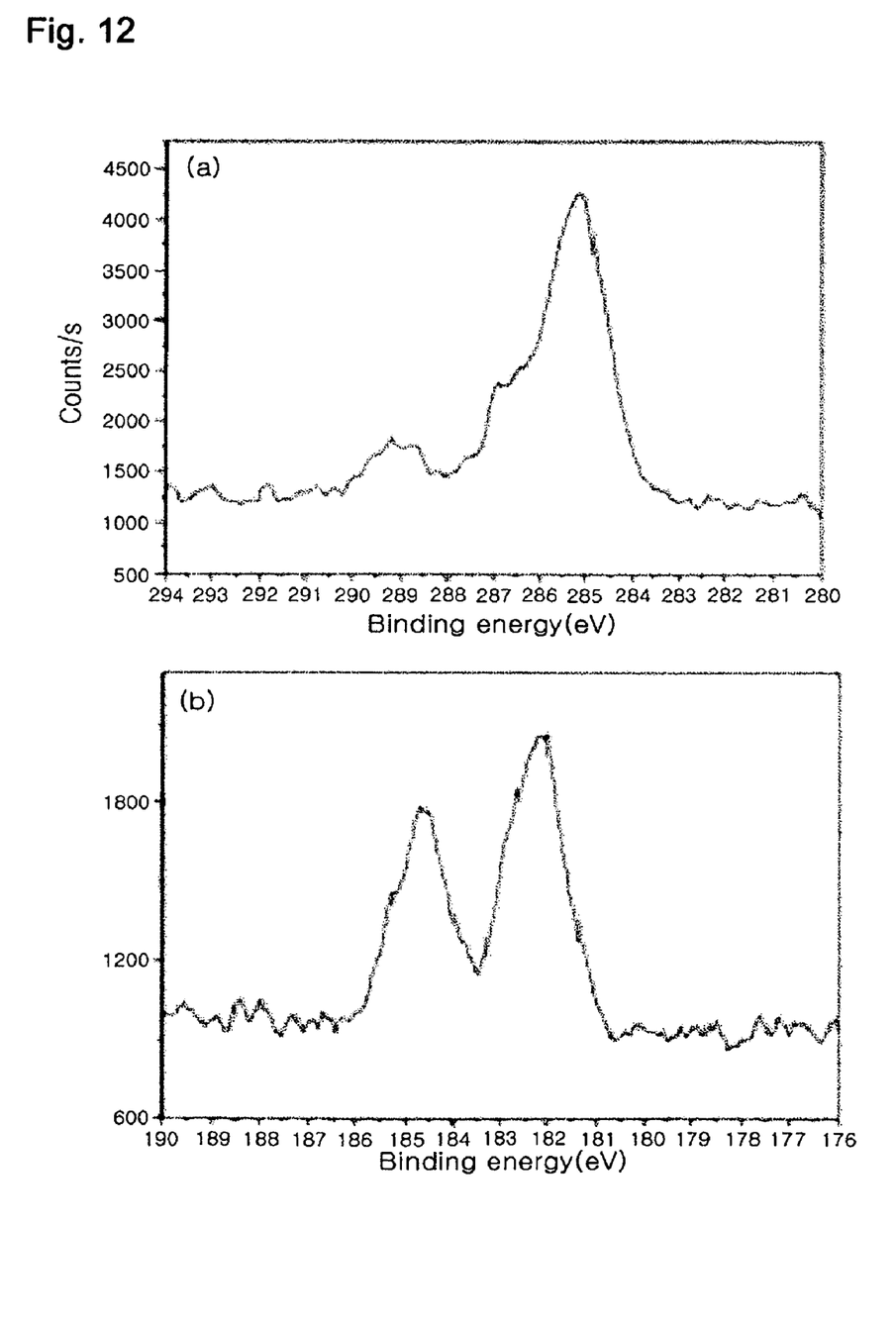
FIG. 12 shows XPS spectra of C1s and Zr3d of $^3$Zr,S—TiO$_2$.

FIG. 12 shows XPS spectra of C1s and Zr3d of the $^3$Zr,S—TiO$_2$ catalyst. The C1s peaks were detected in the range of 283-291 eV and the Zr3d peaks were detected in the range of 180-186 eV. The XPS spectrum of C1s shows that most C atoms had a binding energy of 285 eV, indicating that C atoms are present in a solid solution form in the TiO$_2$ matrix. The remaining non-hydrolyzed alkoxy groups, the precursor solution and incorporation by chance account for the detection of the carbon element by XPS. The binding energy of Zr3d detected at around 182.2 eV implies the presence of Zr3d$_{5/2}$ in the Ti$_{1-x}$Zr$_x$O$_2$ solid solution.

Experimental Example 9

Figure 13:
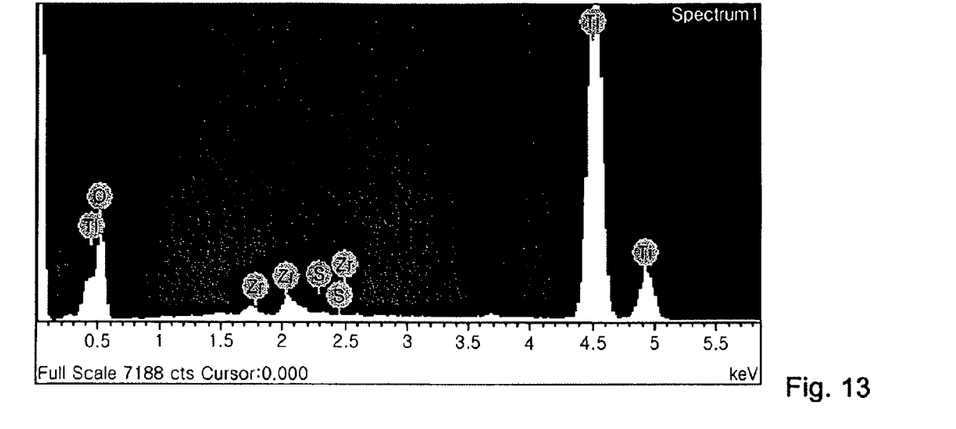
FIG. 13 shows the results of EDS analysis for $^3$Zr,S—TiO$_2$ after calcination at 450° C.

The XPS results of the $^3$Zr,S—TiO$_2$ catalyst show the absence of S. As another analytical technique, energy dispersive spectroscopy (EDS) was employed to check whether sulfur was present or absent. The EDS analysis was conducted using a field emission scanning electron microscope (FESEM, S-4200 HITACHI) equipped with an energy dispersive spectrometer. FIG. 13 shows the results of EDS analysis for the $^3$Zr,S—TiO$_2$ catalyst after calcination at 450° C. The presence of 0.13 wt % of sulfur in the catalyst was ascertained by the EDS analysis.

Experimental Example 10

Figure 14:
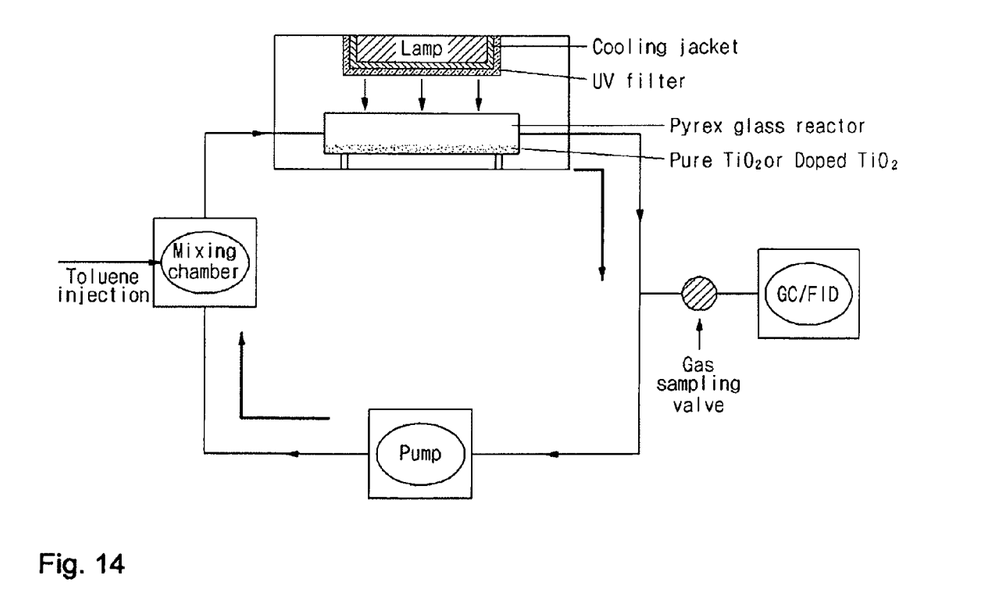
FIG. 14 is a schematic diagram of a photoreactor.

The photocatalytic activity of the photocatalysts was checked through the photodegradation of toluene under visible light. The photocatalytic activity testing was conducted in a closed circulation type reactor. FIG. 14 is a schematic diagram of the photoreactor used in the present invention. Specifically, each of the photocatalysts (300±0.5 mg) was well applied to a portion where light was incident in a 1 L tubular Pyrex glass reactor. The reactor was connected to a pump via a specialty tube. The circulation rate of the pump was 320 cm$^3$/min. The reactor connected to the pump was positioned within a black glass box (size: 30 cm×42 cm×27 cm) provided with a 150 W halogen lamp (OSRAM HALOLINE) with a UV filter. The distance between the lamp and the catalyst was adjusted to 15 cm. A glass mixing chamber at 70° C. was connected to the photoreactor. Then, toluene was injected into the photoreactor through the mixing chamber to check the catalytic activity of the catalyst. The total volume of the photoreactor and the mixing chamber was about 1.3 L. The amount of the toluene used in each reaction was 3.0 μL (2.54×10$^{-5}$ M, 530 ppmv). Before testing, the photoreactor with the catalyst was placed in the dark. Toluene was injected into the photoreactor and circulated using the pump. The circulation was continued for about 2 hours until the toluene was sufficiently adsorbed and desorbed on the surface of the catalyst and the adsorption/desorption reached equilibrium. Thereafter, light was irradiated on the catalyst to record the amount of the remaining toluene every hour. The catalytic activity was basically tested every four hours. The periodical checking was performed using a gas chromatograph (Shimadzu GC-17A, Shimadzu Corporation) capable of gas sampling. Assuming that the degradation rate of the toluene is described by the pseudo-first-order kinetics, the reaction constant was calculated by the following equation.

$$\ln(C_0/C) = kt$$

Figure 15:
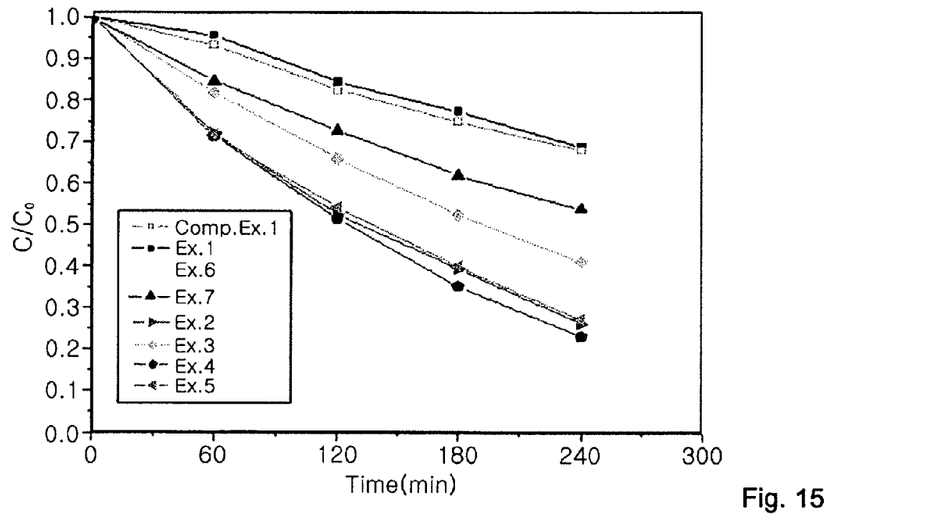
FIG. 15 is a graph showing the relationship between light irradiation time and $C_o/C$ values of toluene, demonstrating the activity of catalysts under visible light.
Figure 16:
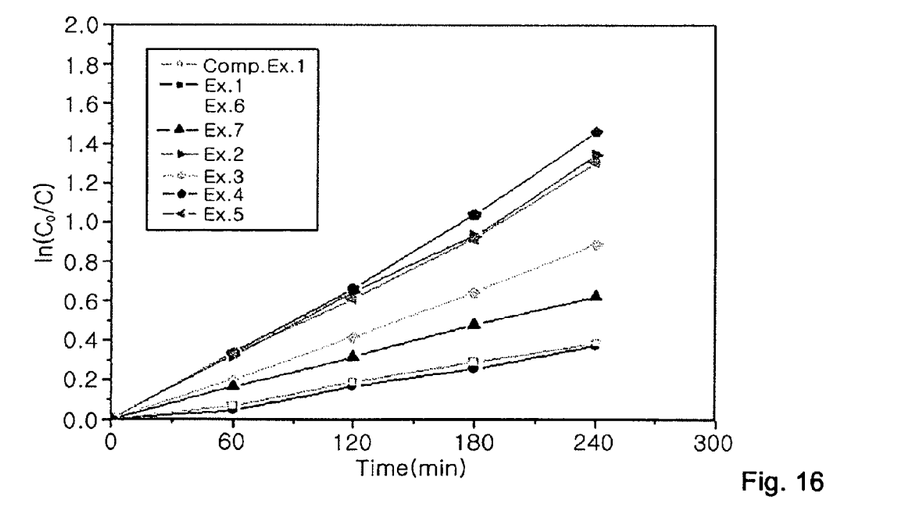
FIG. 16 is a graph showing the relationship between light irradiation time and $\ln(C_0/C)$ values of toluene.

$C_0$: Initial concentration of toluene
C: Concentration of toluene after the passage of a predetermined time
t: Time (min.)
k: Reaction constant The activity test results are shown in Table 3. The relationships between the light irradiation time and the toluene concentration ratio ($C_0/C$) and between the light irradiation time and the toluene concentration ratio ($\ln(C_0/C)$) are shown in FIGS. 15 and 16, respectively. In all catalysts, there is a substantially linear relationship between the light irradiation time and $\ln(C_0/C)$, demonstrating that the toluene degradation is a pseudo-first-order reaction.

From the graph of FIG. 15, it is confirmed that the undoped photocatalyst (Comparative Example 1) and the undoped photocatalyst (Example 1) showed low photocatalytic activity under visible light and that the photocatalytic activity of the $^3$Zr—TiO$_2$ was relatively improved compared to that of the undoped photocatalysts but was poor compared to that of the S—TiO$_2$ photocatalyst.

An important factor determining the activity of the photocatalysts under visible light is the light absorption range of the catalysts. The foregoing results from the DRS analysis reveal that the absorption wavelengths of the TiO$_2$ and the $^3$Zr—TiO$_2$ photocatalysts fell in the UV region. Accordingly, the reactivity of these catalysts under visible light is predicted to be lower than the sulfur-containing catalysts. Meanwhile, all Zr,S—TiO$_2$ catalysts showed better photocatalytic activity than the TiO$_2$ catalyst doped with sulfur only. Particularly, the $^3$Zr,S—TiO$_2$ photocatalyst showed the best catalytic activity.

Heterogeneous photocatalytic reactions of gas-solid phases occur on the surface of photocatalysts. Therefore, catalysts with improved surface characteristics exhibit good catalytic activity. Zr doping of a catalyst blocks the crystal growth induced during calcination to maintain the inherent porosity of the catalyst to some extent, resulting in an increase in the surface area of the catalyst. Additionally, as can be seen from the calculated lattice constants of the Zr,S—TiO$_2$ catalysts, it was observed that the lattices of the catalysts were distorted by doping, leaving the possibility that vacancies may be formed in the lattices. As a result of the lattice distortion, oxygen ions are separated from the surfaces of the catalysts and combine with holes generated upon light irradiation. Based on this mechanism, the oxygen ions ($O^{2-}$) separated from the catalyst surfaces continuously combine with holes and are sequentially converted to $O^-$ and oxygen atoms (O). The oxygen atoms (O) have the ability to react with and degrade organic substances on the catalyst surfaces. Due to the oxygen atoms formed by the lattice distortion, the doped photocatalysts have better catalytic activity than the undoped catalysts. An increase in Zr content induces an improvement in the surface characteristics of the catalysts, a decrease in the size of the particles and an increase in the distortion of the lattices, thus leading to the expectation that the activity of the catalysts will increase. In actuality, however, the photocatalytic activity of the Zr,S—TiO$_2$ catalysts increases in the order: $^3$Zr,S—TiO$_2$ > $^{0.5}$Zr,S—TiO$_2$ > $^5$Zr,S—TiO$_2$ > $^1$Zr,S—TiO$_2$. The results clearly demonstrate that better photocatalytic activity is determined by the optimum Zr amount.

Figure 17:
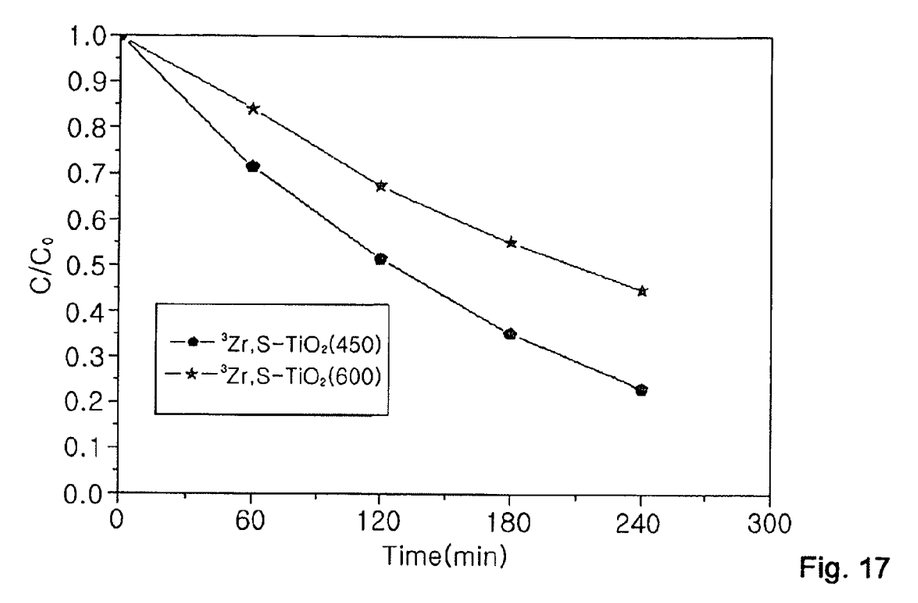
FIG. 17 is a graph showing the variations in the activity of $^3$Zr,S—TiO$_2$ under visible light at different calcination temperatures.
Figure 18:
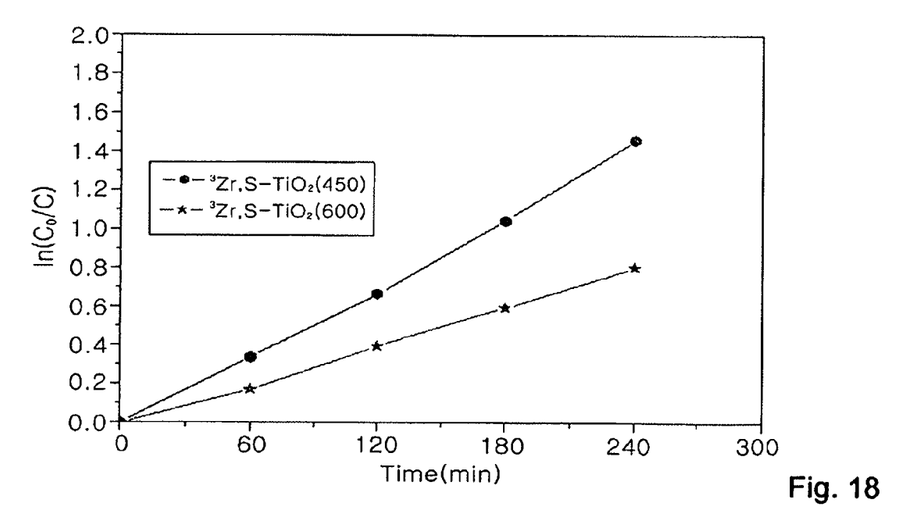
FIG. 18 is a graph showing the variations in the reaction rate of $^3$Zr,S—TiO$_2$ under visible light at different calcination temperatures.

The activity of the photocatalysts is also dependent on the calcination temperature. The $^3$Zr,S—TiO$_2$ catalyst was calcined at a temperature of 450 or 600 to check the catalytic activity of the catalyst. The results are shown in FIGS. 17 and 18. The graphs of FIGS. 17 and 18 reveal that the catalyst calcined at the higher temperature showed poor catalytic activity under visible light. These observations show good agreement with the foregoing results from the DRS analysis. Meanwhile, the $^3$Zr,S—TiO$_2$ catalyst calcined at 600° C. showed better activity than the undoped TiO$_2$ catalyst.

The catalysts produced in Comparative Example 1 and Example 1 were calcined at 600° C. The catalytic activity of the catalyst produced in Example 1 was about three times that of the catalyst produced in Comparative Example 1.

TABLE 3

| Catalysts (° C.) | Toluene degradation$^a$ (%) | $k^b$ (min$^{-1}$) |
|---|---|---|
| TiO$_2$ (450)-Comparative Example 1 | 25.21 | 0.001615 ± 0.0001 |
| TiO$_2$ (450)- Example 1 | 31.34 | 0.001566 ± 0.0002 |
| $^3$Zr—TiO$_2$ (450) | 46.28 | 0.002589 ± 0.0003 |
| S—TiO$_2$ (450) | 55.87 | 0.003409 ± 0.0003 |
| $^{0.5}$Zr,S—TiO$_2$ (450) | 73.91 | 0.005598 ± 0.0006 |
| $^1$Zr,S—TiO$_2$ (450) | 58.85 | 0.0037 ± 0.0003 |
| $^3$Zr,S—TiO$_2$ (450) | 76.76 | 0.006081 ± 0.0007 |
| $^5$Zr,S—TiO$_2$ (450) | 72.81 | 0.005427 ± 0.0004 |
| $^3$Zr,S—TiO$_2$ (600) | 55.25 | 0.00335 ± 0.0003 |
| TiO$_2$ (600)-Comparative Example 1 | 2.586 | |
| TiO$_2$ (600)- Example 1 | 7.835 | |

$^a$Measured after reaction for 4 hours
$^b$Obtained from the correlation between the reaction time and ln(C$_0$/C).

In conclusion, the TiO$_2$ and the Zr,S—TiO$_2$ catalysts produced using the advanced sol-gel process had high mesoporosity and showed excellent surface characteristics to achieve increased catalytic activity and improved high-temperature stability. Particularly, the photocatalysts doped with zirconium and sulfur had absorption wavelengths shifted in the visible region and exhibited catalytic activity even in the visible region. Further, the photocatalysts of the present invention showed excellent surface characteristics in terms of surface area, pore size and pore volume and could be calcined at high temperatures to achieve high degree of crystallization, resulting in an increase in catalytic activity.

As apparent from the foregoing, a nanometer-sized photocatalyst can be produced without the use of any particular additive by the method of the present invention. The photocatalyst has high mesoporosity and exhibits excellent surface characteristics and improved catalytic activity. In addition, the photocatalyst can be calcined at a high temperature. Therefore, it appears that the photocatalyst of the present invention contributes to import substitution.

The present invention also provides a titanium dioxide photocatalyst doped with zirconium and sulfur, which is produced by the method of the present invention. The doped titanium dioxide photocatalyst exhibits catalytic activity even under visible light and excellent surface characteristics in terms of surface area, pore size, pore volume, etc. to achieve improved photocatalytic activity. Therefore, light can be used to degrade various pollutants, for example harmful organic substances and volatile organic compounds (VOCs) causing the sick house syndrome, thus eliminating the need to apply particular energy. In addition, the zirconium/sulfur-doped titanium dioxide photocatalyst can be used in antiviral and antibacterial applications to solve sanitary problems caused by various resistant bacteria posing a threat to humans. Furthermore, since the zirconium/sulfur-doped titanium dioxide photocatalyst can be used to split water into hydrogen and oxygen, it is expected to contribute to next-generation energy technology and solve environmental problems.

What is claimed is:

1. A method for producing a titanium dioxide photocatalyst, the method comprising the steps of:

(1) adding a solution ("Solution A") containing an acid, water and an organic solvent dropwise to a solution of a titanium alkoxide in an organic solvent with stirring until the pH of the resulting solution is adjusted to 0.5 to 2.0;

(2) reacting the mixed solution with stirring for 12 to 48 hours to form a sol;

(3) adding a basic aqueous solution dropwise at a rate of 0.05 to 0.5 ml/sec to the reaction solution with stirring until the pH of the resulting solution reaches 6.0 to 10.0 to convert the sol to a gel;

(4) drying the gel at 110° C. for 12 hours, followed by pulverization to obtain a powder; and (5) calcining the powder at 350 to 800° C.

2. The method according to claim 1, further comprising the step of aging the gel for 2 to 5 hours and washing the aged gel after step (3).

3. The method according to claim 1, wherein, in step (1), Solution A is added in an amount such that the molar ratio of the titanium alkoxide to the water is between 1:10 and 1:30.

4. The method according to claim 1, wherein the titanium alkoxide is selected from the group consisting of tetraethyl orthotitanate, titanium tetraisopropoxide, tetrabutyl orthotitanate, and mixtures thereof.

5. The method according to claim 1, wherein the acid is selected from the group consisting of nitric acid, hydrochloric acid, phosphoric acid, acetic acid, formic acid, carbonic acid, sulfuric acid and mixtures thereof.

6. The method according to claim 1, wherein the organic solvent is a C$_1$-C$_6$ alcohol.

7. The method according to claim 1, wherein the base used in step (3) is selected from the group consisting of sodium hydroxide, potassium hydroxide, ammonium hydroxide, ammonia, amine and mixtures thereof.

8. The method according to claim 1, wherein step (1) further includes the sub-step of simultaneously adding an organic solution ("Solution B") containing a metal source and a non-metal source and Solution A dropwise to dope the titanium dioxide photocatalyst with the metal and the non-metal.

9. The method according to claim 8, wherein the metal source is a zirconium source and the non-metal source is a sulfur source.

10. The method according to claim 9, wherein the zirconium source is selected from the group consisting of zirconium acetylacetonate, zirconium chloride, zirconyl chloride hydrate, and mixtures thereof.

11. The method according to claim 9, wherein the sulfur source is selected from the group consisting of thiourea, thioacetamide, sulfuric acid and mixtures thereof.

12. A titanium dioxide photocatalyst produced by the method according to claim 1.

13. The titanium dioxide photocatalyst according to claim 12, wherein the photocatalyst has an anatase crystal structure.

14. A titanium dioxide photocatalyst doped with sulfur and zirconium.

15. The titanium dioxide photocatalyst according to claim 14, wherein the zirconium is doped in an amount of 0.5 to 6 parts by weight, based on 100 parts by weight of titanium dioxide.

16. The titanium dioxide photocatalyst according to claim 14, wherein the sulfur is doped in an amount of 0.1 to 1.5 parts by weight, based on 100 parts by weight of titanium dioxide.

* * * * *